United States Patent [19]

Smith et al.

[11] Patent Number: 4,520,878

[45] Date of Patent: Jun. 4, 1985

[54] SPRING CUSHION CHISEL PLOW SHANK ASSEMBLY

[75] Inventors: David R. Smith; Maynard M. Herron, both of Hesston, Kans.

[73] Assignee: Hesston Corporation, Hesston, Kans.

[21] Appl. No.: 507,279

[22] Filed: Jun. 23, 1983

[51] Int. Cl.³ .................... A01B 61/04; A01B 35/24
[52] U.S. Cl. .................................................. 172/705
[58] Field of Search ............. 172/705, 707, 708, 710, 172/264, 265

[56] References Cited

U.S. PATENT DOCUMENTS

| 1,041,975 | 10/1912 | Dennis. | |
| 2,935,144 | 5/1960 | Graham | 172/265 |
| 3,700,038 | 10/1972 | Essex | 172/705 |

FOREIGN PATENT DOCUMENTS

| 409123 | 12/1969 | Australia | 172/705 |
| 1112110 | 11/1981 | Canada | 172/705 |
| 2498875 | 8/1982 | France | 172/705 |

Primary Examiner—Richard J. Johnson
Attorney, Agent, or Firm—Schmidt, Johnson, Hovey & Williams

[57] ABSTRACT

A spring cushion assembly for a chisel plow shank is provided that eliminates the transmission of force from the shank and assembly spring to the tension rod of the assembly in directions transverse to the axis of the tension rod, thereby prolonging the life of the entire assembly. The spring cushion shank assembly includes a support frame pivotally supporting a shank, a spring interposed between a portion of the frame and the shank, and a tension rod received within the spring in non-contacting relationship. A seat supports the lower end of the spring and minimizes the tendency of the spring to buckle by coupling the spring to the shank about a pivot axis and by continuously aligning the longitudinal axis of the spring in intersecting relationship with the pivot axis as the spring is compressed.

6 Claims, 7 Drawing Figures

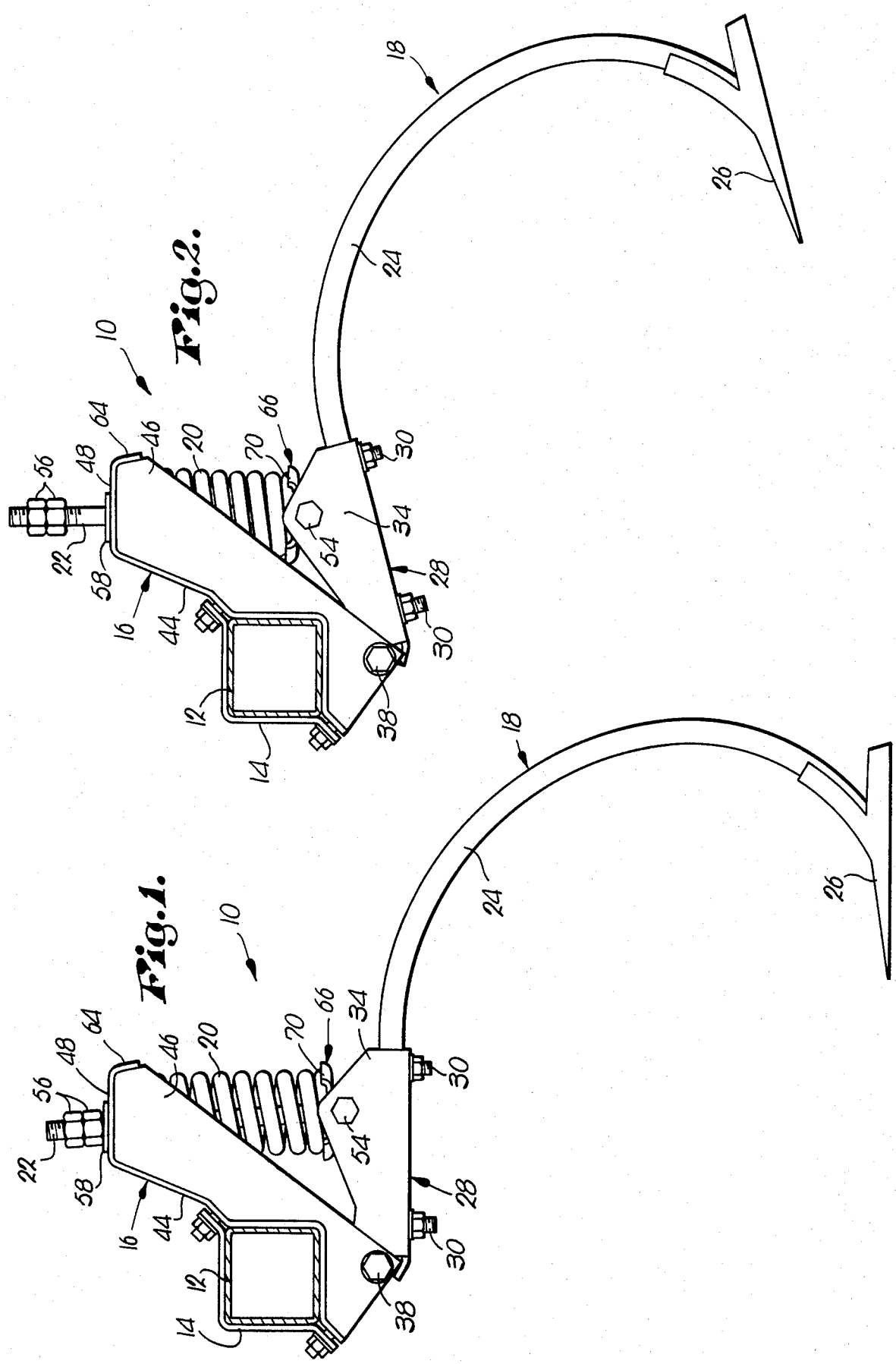

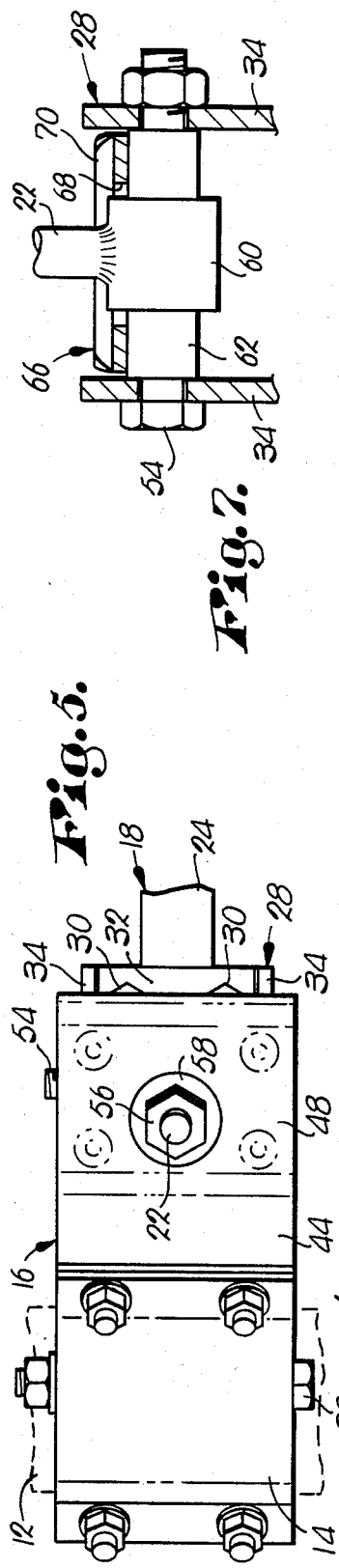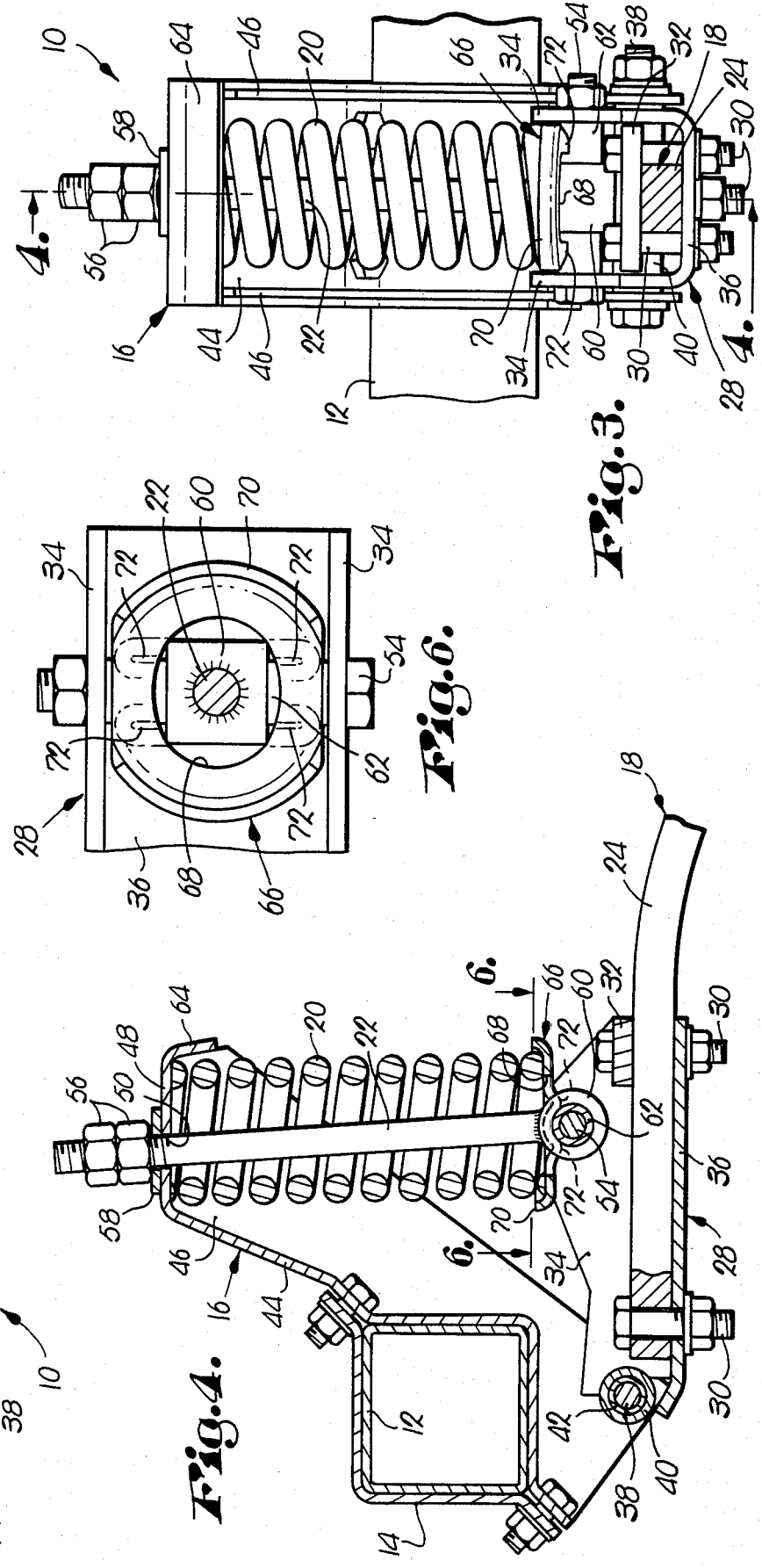

SPRING CUSHION CHISEL PLOW SHANK ASSEMBLY

TECHNICAL FIELD

This invention relates to the field of earth working implements, and, more particularly, to an improved spring cushion assembly for the shank of a chisel plow.

BACKGROUND ART

Spring cushion assemblies have in the past been provided for chisel plows and similar earth working equipment. Such spring assemblies normally include compression springs and tension rods for biasing and positioning an earth working tool into a working position. The compression springs of the assemblies are subjected to buckling forces as they are compressed in response to the earth working tool encountering obstructions. Conventional spring cushion assemblies counteract the buckling forces by engaging and rigidifying the inner portion of the spring directly or indirectly by the tension rod. This manner of counteracting the buckling forces on the spring, however, transmits forces from the spring to the rod in directions transverse to the axis of the rod. The deflected rod, in turn, rubs against the confines of an upper retaining aperture in the frame as the rod moves up and down during shank operation, thereby inducing excessive wear in the rod and the aperture.

A spring cushion assembly for a chisel plow or similar earth working equipment that would minimize the buckling forces applied to the compression spring and would counteract buckling forces that are applied to the spring without transmitting those forces to the tension rod of the assembly would greatly enhance the useful life of the spring cushion assembly, and would be a decided advantage.

SUMMARY OF THE INVENTION

The problems outlined above are in large measure solved by the spring cushion assembly in accordance with the present invention. That is to say, the spring cushion assembly hereof minimizes the buckling forces applied to the assembly spring, and eliminates the transfer of force to the tension rod in directions transverse to the axis of the tension rod.

The spring cushion assembly in accordance with the present invention broadly includes a frame pivotally supporting an earth working tool, a compression spring interposed between the frame and the tool for biasing the tool to a lowered working position, a tension rod received within the spring in non-contacting relationship, and a seat for the spring pivotally coupling the spring to the tool about a pivot axis. The seat also aligns the longitudinal axis of the spring with the pivot axis so as to minimize the buckling forces applied to the spring as the spring is compressed.

BRIEF DESCRIPTION OF THE DRAWINGS

FIG. 1 is a side-elevational view of a spring cushion shank assembly in accordance with the present invention mounted on a tool bar that is shown in cross-section, the shank being shown in its fully lowered position;

FIG. 2 is similar to FIG. 1 but with the shank in a retracted position;

FIG. 3 is a fragmentary, enlarged, rear, vertical sectional view of the assembly;

FIG. 4 is a sectional view taken along the line 4—4 of FIG. 3;

FIG. 5 is a fragmentary, top plan view of the assembly;

FIG. 6 is an enlarged sectional view of the lower retaining spring seat of the assembly taken along the line 6—6 of FIG. 4; and FIG. 7 is a fragmentary, enlarged, vertical sectional view of the lower portion of the assembly.

DESCRIPTION OF THE PREFERRED EMBODIMENT

Referring to the drawings, a chisel plow shank assembly 10 is depicted secured to the main frame 12 of a farm implement by bracket 14. The assembly 10 broadly includes a support frame 16, an earth working tool 18 pivotally connected to the frame 16, a compression spring 20 interposed between the tool 18 and a portion of the frame 16, and a tension rod 22 received within the spring 20 in non contacting relationship.

The tool 18 includes a shank 24 and a chisel tip 26. A spring support channel 28 is connected to the shank 24 via bolts 30. As best seen in FIGS. 3 and 4, one of the bolts 30 is received through an aperture in the shank 24, and the remaining two of the bolts 30 are received through a retaining plate 32, thereby interposing the shank 24 between the channel 28 and the retaining plate 32. The channel 28 includes a pair of spaced apart, parallel legs 34 interconnected by a bight 36. The channel 28 is connected to the frame 16 by a connecting bolts 38 received through a tubular sleeve 40 interconnecting the legs 34. A bushing 42 is interposed between the sleeve 40 and the bolt 38.

The support frame 16 is a channel member having a bight 44 and a pair of depending legs 46. The frame 16 includes an uppermost end plate 48 having a tension rod receiving aperature 50 therethrough.

The tension rod 22 is received through aperature 50, and is pivotally connected to the legs 34 of channel 28 by a clamp bolt 54. The upper end of the rod 22 is threaded, and a pair of nuts 56 are received thereon. A washer 58 is fixed in place on plate 48, interposed between the nuts 56 and the plate 48. The lower end of tension rod 22 is provided with a transverse tubular sleeve 60 through which tubular bushing 62 is received. Clamp bolt 54 is received through bushing 62.

Compression spring 20 is interposed between the plate 48 and shank 24, and surrounds tension rod 22 in spaced apart, noncontacting relationship. The upper end of spring 20 is held in place by the bight 44, depending legs 46, and a down-turned, rearmost lip 64 of the frame 16. The length of spring 20 is advantageously no more than four times the mean diameter of the spring.

A generally cup-shaped spring base support seat 66 pivotally rests on bushing 62, and supports the lower end of spring 20 such that the center axis of the spring intersects the axis of clamp bolt 54. Seat 66 includes a central aperture 68 through which the rod 22 extends and in which an upper portion of the horizontal sleeve is received. The seat 66 also includes an upturned peripheral lip 70, opposing portions of which are cut away to accommodate the legs 34 of channel 28. Depending, parallel, spaced apart protrusions 72 on the bottom of seat 66 straddle the bushing 62 and center the seat 66 along the pivot axis defined by clamp bolt 54.

In operation, lock nuts 56 may be adjusted to appropriately preload the compression of spring 20, and orient the earth working tool 18 to its lowered position as depicted in FIG. 1. When obstructions are encountered by the tool 18, the tool swings toward the position of FIG. 2 against the action of spring 20 in order to slip up and over the obstruction. Clamp bolt 54 is thereby moved through an arc entered about bolt 38.

As the clamp bolt 54 is moved through the arc, however, the seat 66 swivels about the axis of sleeve 60, maintaining the lower face of spring 20 substantially normal to the longitudinal axis of the spring 20 and thereby reducing the buckling forces applied to spring 20. Moreover, the retaining lip 70 engages the outer surface of the spring 20 adjacent the spring's lower end and centers the longitudinal axis of the spring 20 with the pivot axis defined by clamp bolt 54, again reducing the buckling forces applied to spring 20. The centering of the spring 20 is important, since shifting of the longitudinal axis of the spring 20 as little as one quarter inch away from the pivot axis defined by clamp bolt 54 can cause buckling forces to be applied to the spring.

It will be appreciated that the tension rod 22 freely floats within the spring 20, even while the spring is being compressed, since the tension rod 22 and spring 20 are maintained in spaced apart, noncontacting relationship. Forces created by the moving of tool 18 between the positions depicted in FIG. 1 and 2 that would otherwise be directed transverse to the axis of tension rod 22 via lateral movement of the spring 20 into engagement with the rod 22 are simply not transmitted to the tension rod. The tension rod 22, therefore, does not unduly wear against the edges of aperture 50 in plate 48, as has been the case in conventional spring cushion assemblies, and the useful life of the spring cushion assembly is accordingly increased.

The use of a spring 20 that has a length no longer than four times its mean diameter, together with the unique seat 66, allows the spring 20 to compress as much as five inches before the spring experiences any substantial tendency to buckle. This is to be compared with the conventional spring cushion assemblies that experience buckling forces with considerably less spring compression.

We claim:

1. A tillage shank assembly comprising:
   a bracket having one end provided with an aperture;
   an earthworking shank pivotally coupled with said bracket remote from said one end thereof for swinging movement generally toward and away from said one end about a transverse axis;
   a coil spring interposed between said one end of the bracket and said shank for yieldably biasing the latter away from said one end about said axis;
   an elongated member housed within said spring longitudinally thereof;
   means at one terminus of the member pivotally coupling the same with said shank and including transverse pivot means,
   said member having its opposite terminus telescopically received within said aperture for extension and retraction therethrough during said swinging movement of the shank; and
   retainer means adjacent said one terminus of the member for maintaining the coils of the spring in radially spaced relation to said element throughout the length of the spring in all positions of said swinging movement of the shank whereby to avoid transverse loading on said member by the spring,
   said retainer means including a seat on said pivot means for one end of said spring having generally longitudinally projecting structure integral with the seat confining the spring against movement on the seat,
   said seat and said member being coupled with said pivot means independently of one another, and said one end of the bracket engageably confining the opposite end of the spring against lateral movement, whereby said member is isolated from transverse loading forces imparted to the seat and the bracket by said spring.

2. A tillage shank assembly as claimed in claim 1, wherein said member is provided with an enlargement on said opposite extremity thereof operable to abuttingly engage said one end of the bracket on the side thereof opposite said spring whereby to limit the extent of movement of said shank away from the bracket.

3. The tillage shank assembly as claimed in claim 1, wherein said seat is of annular configuration, having a central aperture through which said member extends from its coupling with said pivot means.

4. A tillage shank assembly as claimed in claim 3, wherein said member has a transversely extending sleeve fixed thereto at said one terminus and rotatably receiving said pivot means, said sleeve projecting into said aperture in clearing relationship to said seat, said seat engaging said pivot means outboard of said sleeve.

5. A tillage shank assembly as claimed in claim 4, wherein said seat is provided with a plurality of depending, spaced protrusions straddling said pivot means and rendering the seat rotatable relative thereto, 6. A tillage shank assembly as claimed in claim 1, wherein said seat is generally cup-shaped, said longitudinally projecting structure comprising an outer, peripheral lip portion of the seat confining the spring from the exterior thereof.

* * * * *